US012558753B2

(12) United States Patent
 Yamamoto

(10) Patent No.: US 12,558,753 B2
(45) Date of Patent: Feb. 24, 2026

(54) MACHINE TOOL CONTROL DEVICE

(71) Applicant: FANUC CORPORATION, Yamanashi (JP)

(72) Inventor: Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 563 days.

(21) Appl. No.: 17/999,021

(22) PCT Filed: May 25, 2021

(86) PCT No.: PCT/JP2021/019743
 § 371 (c)(1),
 (2) Date: Nov. 16, 2022

(87) PCT Pub. No.: WO2021/241552
 PCT Pub. Date: Dec. 2, 2021

(65) Prior Publication Data
 US 2023/0173632 A1 Jun. 8, 2023

(30) Foreign Application Priority Data
 May 29, 2020 (JP) ................................. 2020-094465

(51) Int. Cl.
 *B23Q 15/12* (2006.01)
 *B23B 25/02* (2006.01)
 (Continued)

(52) U.S. Cl.
 CPC ........... *B23Q 15/12* (2013.01); *B23Q 15/013* (2013.01); *B23Q 15/08* (2013.01); *B23Q 15/14* (2013.01); *B23B 25/02* (2013.01)

(58) Field of Classification Search
 None
 See application file for complete search history.

(56) References Cited

U.S. PATENT DOCUMENTS

2009/0107308 A1 4/2009 Woody et al.
2017/0102685 A1* 4/2017 Kitakaze ................. B23B 25/02

FOREIGN PATENT DOCUMENTS

JP 2017-182336 A 10/2017
JP 2018-181110 A 11/2018
 (Continued)

OTHER PUBLICATIONS

International Search Report issued in PCT/JP2021/019743; mailed Aug. 10, 2021.

*Primary Examiner* — Ryan A Jarrett
(74) *Attorney, Agent, or Firm* — Studebaker Brackett PLLC

(57) ABSTRACT

Provided is a machine tool control device that can realize a desired scrap length while suppressing deterioration in machining accuracy. This control device 1 is for a machine tool which performs machining while causing a tool and a workpiece to oscillate relative to each other, the control device 1 being provided with: an oscillation command generation unit 13 for generating an oscillation command on the basis of an oscillation condition; an oscillation command correction unit 14 for correcting the oscillation command so that main-axis phases in given oscillation phases are not identical to each other; and a position/speed control unit 18 for causing the tool and the workpiece to oscillate relative to each other on the basis of a superposition command generated by superposing the oscillation command corrected by the oscillation command correction unit 14 on a movement command.

8 Claims, 10 Drawing Sheets

(51) Int. Cl.
    *B23Q 15/013*        (2006.01)
    *B23Q 15/08*         (2006.01)
    *B23Q 15/14*         (2006.01)

(56)                    References Cited

FOREIGN PATENT DOCUMENTS

| JP | 2019-028597 | A | 2/2019 |
| JP | 6470085 | B2 | 2/2019 |
| WO | 2015/146946 | A1 | 10/2015 |

* cited by examiner

FEED AXIS
DIRECTION ←

FEED AXIS
DIRECTION ←

OSCILLATION FREQUENCY MULTIPLYING FACTOR : 1.35 TIMES

OSCILLATION FREQUENCY MULTIPLYING FACTOR : 1.65 TIMES

OSCILLATION FREQUENCY MULTIPLYING FACTOR : 1.5 TIMES
CASE WHERE SPINDLE PHASE ADVANCES BY 10°

OSCILLATION FREQUENCY MULTIPLYING FACTOR : 1.5 TIMES
CASE WHERE SPINDLE PHASE ADVANCES BY 50°

OSCILLATION FREQUENCY MULTIPLYING FACTOR : 1.5 TIMES

FEED AXIS DIRECTION

SPINDLE PHASE

MACHINE TOOL CONTROL DEVICE

TECHNICAL FIELD

The present disclosure relates to a machine tool controller.

BACKGROUND ART

Conventionally, oscillation cutting has been sometimes applied as a countermeasure against chips in drilling and turning. When the oscillation cutting is applied, the degree of deterioration varies within one rotation of a workpiece under specific oscillation conditions, and thus machining accuracy for the workpiece may be particularly deteriorated, and the circularity of the workpiece may also be greatly affected.

Therefore, a machine tool controller has been proposed that not only sequentially and reliably cuts chips generated from the workpiece but also reduces the deterioration of the machining accuracy (for example, see Patent Document 1). In such a machine tool controller, a reciprocating oscillation frequency per one relative rotation of the workpiece and the tool is set such that intersections of oscillation trajectories are distributed. Thus, the intersections of the trajectories of the cutting tool are distributed in a relative rotation direction, and as a result, minute unevenness of a machined surface of a workpiece is uniformly distributed in the relative rotation direction, which is considered to be able to reduce the deterioration in the machining accuracy for the workpiece.

Patent Document 1: Japanese Patent No. 6470085

DISCLOSURE OF THE INVENTION

Problems to be Solved by the Invention

However, according to the controller disclosed in Patent Document 1, the oscillation frequency is changed as a whole, and thus a desired length of chips cannot be achieved. For this reason, there may be a case in which machining defects, momentary stoppages, and machine failures which are caused by entangling of a cutting tool with continuously generated chips cannot be solved.

Therefore, it is desirable to provide a machine tool controller capable of achieving a desired length of chips while reducing deterioration in machining accuracy.

Means for Solving the Problems

An aspect of the present disclosure is directed to a machine tool controller for controlling a machine tool that performs machining while causing a tool and a workpiece to oscillate relative to each other. The machine tool controller includes: an oscillation command generation unit that generates an oscillation command based on oscillation conditions; an oscillation command compensation unit that compensates the oscillation command such that spindle phases do not match with each other at an arbitrary oscillation phase; and a control unit that causes the tool and the workpiece to oscillate relative to each other based on a superimposition command generated by superimposing the oscillation command compensated by the oscillation command compensation unit on a movement command.

Effects of the Invention

According to the aspect of the present disclosure, it is possible to provide a machine tool controller capable of achieving a desired length of chips while reducing deterioration in machining accuracy.

PREFERRED MODE FOR CARRYING OUT THE INVENTION

Embodiments of the present disclosure will be described in detail below with reference to the drawings. In the description of a second and subsequent embodiments, configurations and effects common to those of the first embodiment will not be described, and only configurations and effects different from those of the first embodiment will be described.

First Embodiment

Figure 1:
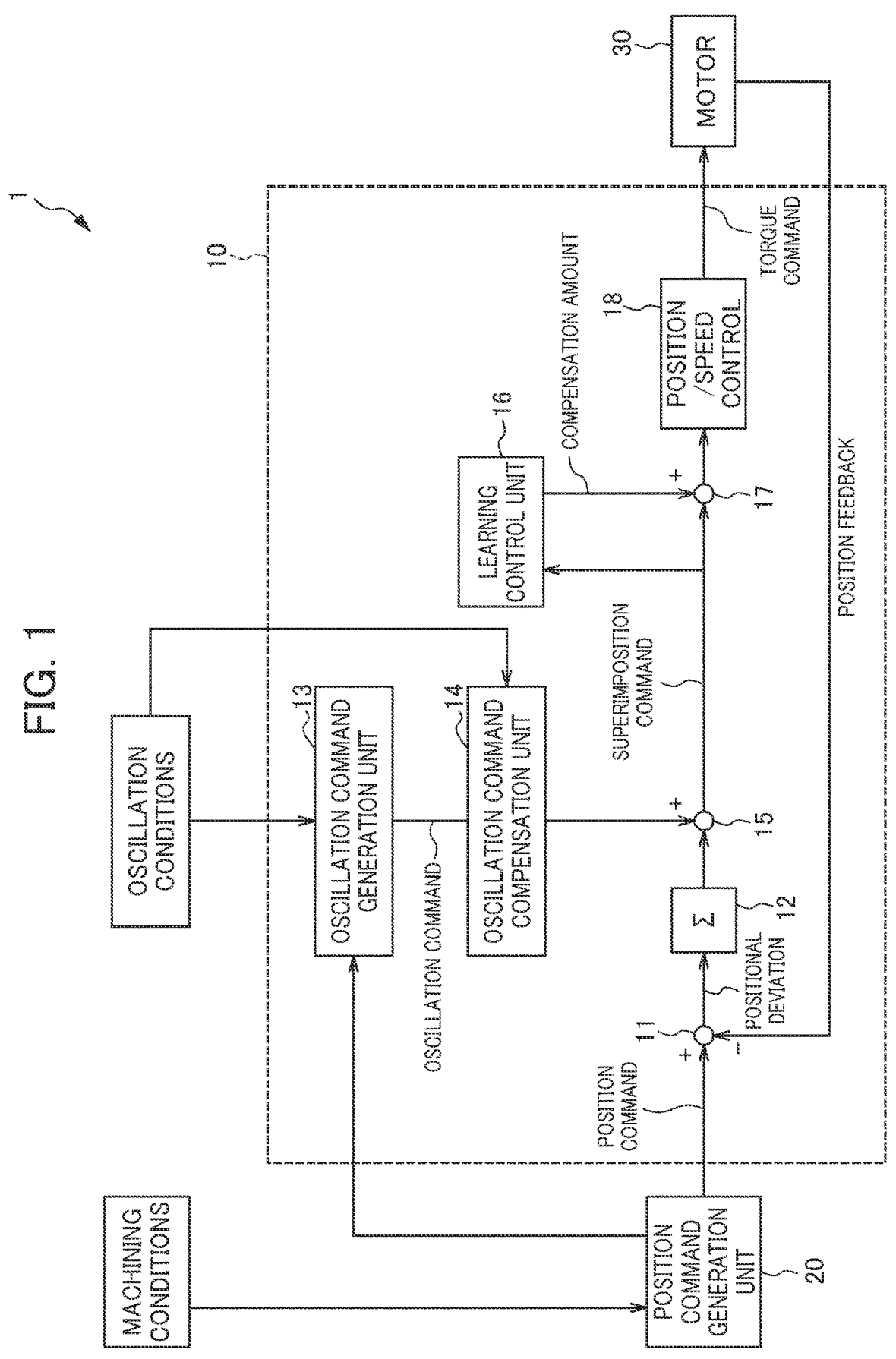
FIG. 1 is a diagram showing a configuration of a machine tool controller according to a first embodiment of the present disclosure.

FIG. 1 is a functional block diagram of a machine tool controller 1 according to a first embodiment of the present disclosure. As shown in FIG. 1, the machine tool controller 1 according to the present embodiment includes a servo controller 10, and controls driving of a motor 30 that drives a feed axis.

As shown in FIG. 1, the machine tool controller 1 according to the present embodiment includes a first adder 11, an integrator 12, an oscillation command generation unit 13, an oscillation command compensation unit 14, a second adder 15, a learning controller 16, a third adder 17, and a position/speed control unit 18.

In the machine tool controller 1 according to the present embodiment, a position command generation unit 20 generates a position command for the motor 30 based on machining conditions. As shown in FIG. 1, the generated position command is input to the first adder 11 of the servo controller 10 to be described below.

The first adder 11 calculates a positional deviation. Specifically, the first adder 11 calculates a positional deviation, which is a difference between a position feedback based on position detection by an encoder provided in the motor 30 on the feed axis and the position command.

The integrator 12 calculates an integrated value of the positional deviation. Specifically, the integrator 12 calculates the integrated value of the positional deviation by integrating the positional deviation calculated by the first adder 11.

The oscillation command generation unit 13 calculates an oscillation command based on oscillation conditions. The oscillation command generation unit 13 may determine the oscillation command from oscillation conditions such as an oscillation amplitude multiplying factor and an oscillation frequency multiplying factor, and machining conditions, or may determine the oscillation command from oscillation conditions such as an oscillation amplitude and an oscillation frequency. In the present embodiment, for example, the oscillation command is calculated from the oscillation conditions and the machining conditions, but may be calculated without using the machining conditions also in consideration of the application to a case where an oscillation axis is stopped, if an oscillation amplitude and an oscillation frequency are set without being changed in the oscillation conditions.

The oscillation command compensation unit 14 compensates the oscillation command, which is generated by the oscillation command generation unit 13, according to the oscillation conditions. Specifically, the oscillation command compensation unit 14 changes a method of advancing an oscillation phase with respect to the oscillation command generated by the oscillation command generation unit 13 in one oscillation immediately before the spindle phases match with each other. The compensation of the oscillation command by the oscillation command compensation unit 14 will be described below in detail.

The second adder 15 generates a superimposition command. Specifically, the second adder 15 generates a superimposition command by superimposing the oscillation command compensated by the oscillation command compensation unit 14 on an integrated value of the positional deviation calculated by the integrator 12. The second adder 15 may be configured to add the oscillation command compensated by the oscillation command compensation unit 14 to the positional command. Alternatively, the second adder 15 may be configured to add the oscillation command compensated by the oscillation command compensation unit 14 to a speed command.

The learning controller 16 calculates a compensation amount for the superimposition command based on the superimposition command, and then causes the third adder 17 to add the calculated compensation amount to the superimposition command to compensate the superimposition command. The learning controller 16 includes a memory, allows the memory to store the oscillation phase and the superimposition command in association with each other in one cycle or a plurality of cycles of oscillation, and at a timing at which a phase delay of an oscillation operation according to responsiveness of the motor 30 can be compensated, reads the superimposition command stored in the memory and outputs the superimposition command as a compensation amount to the third adder 17. In general, the higher the oscillation frequency, the greater the deviation (superimposition command) with respect to the oscillation command, whereby it is possible to improve followability to a cyclic oscillation command with a compensation by the learning controller 16. As a result, it is possible to improve the followability to the superimposition command, and to easily achieve a desired length of chip while reducing deterioration in machining accuracy.

The position/speed control unit 18 generates a torque command for the motor 30, which drives the feed axis, based on the superimposition command after addition of the compensation amount, and controls the motor 30 with the generated torque command. Thus, machining is performed while the tool and the workpiece oscillate relative to each other.

Figure 2:
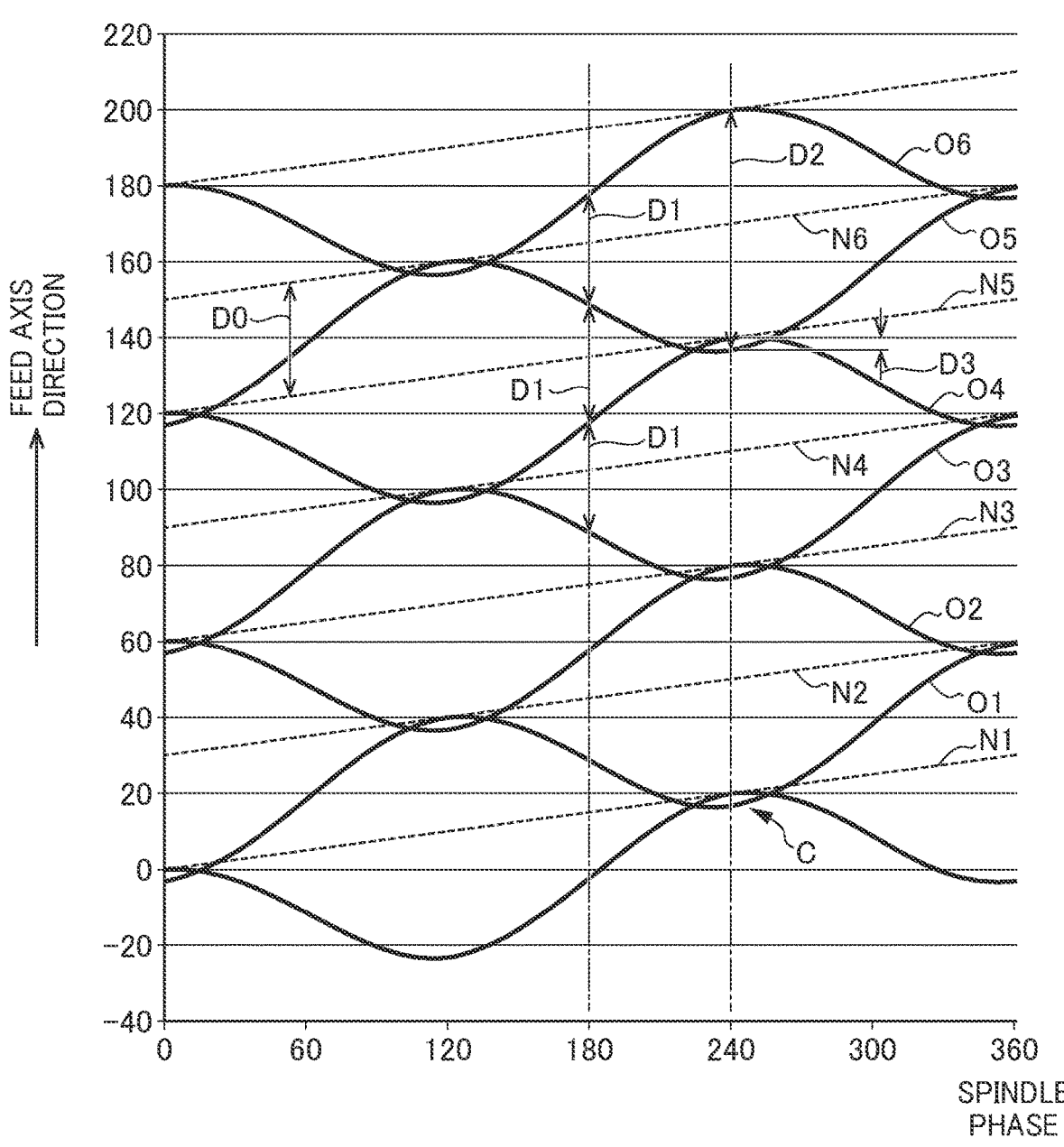
FIG. 2 is a diagram showing a trajectory of a cutting tool on a surface of a workpiece during non-oscillation cutting and conventional oscillation cutting, in which an oscillation frequency multiplying factor is 1.5 times.

Next, a description will be given in detail with respect to the compensation of the oscillation command by the oscillation command compensation unit 14. FIG. 2 is a diagram showing a trajectory of a cutting tool on a surface of the workpiece during non-oscillation cutting and conventional oscillation cutting. In FIG. 2, a horizontal axis represents a spindle phase (0° to 360°), and a vertical axis represents a feed amount (mm) in a feed axis direction. In FIG. 2, a plurality of broken straight lines represent the trajectory of the cutting tool on the surface of the workpiece during the non-oscillation cutting, and a plurality of curved thick solid lines represent the trajectory of the cutting toll on the surface of the workpiece during the conventional oscillation cutting. In the trajectory of the tool during the conventional oscillation cutting indicated by the thick solid line, air cutting C occurs at a portion where a previous path and a current path intersect, and chips are shredded at the air cutting C.

FIG. 2 shows a case where the feed amount of the cutting tool per one rotation of the spindle 1 is constant. Therefore, in FIG. 2, a distance DO between adjacent straight broken lines in the feed axis direction, that is, the distance DO between the previous path and the current path during the non-oscillation cutting is constant.

In contrast, it can be seen that a distance between adjacent curved thick solid lines in the feed axis direction, that is, the distance between the previous path and the current path during the conventional oscillation cutting greatly differs depending on the spindle phase. Specifically, at a position where the spindle phase is 180° indicated by an alternated long and short dash line in FIG. 2, a distance D1 between the previous path and the current path during the conventional oscillation cutting is constant, and has the same distance as the distance DO between the previous path and the current path during the non-oscillation cutting. On the other hand, at a position where the spindle phase is 240° indicated by an alternated long and short dash line in FIG. 2, a distance D2 between the previous path and the current pass during the conventional oscillation cutting and a distance D3 in a direction opposite to the feed direction are repeated. The distance D2 is larger than the distance DO and the distance D1. As can be seen, in the conventional oscillation cutting, the feed amount per rotation of the spindle is not constant depending on the spindle phase, and the feed amount differs greatly depending on the spindle phase.

Figure 3:
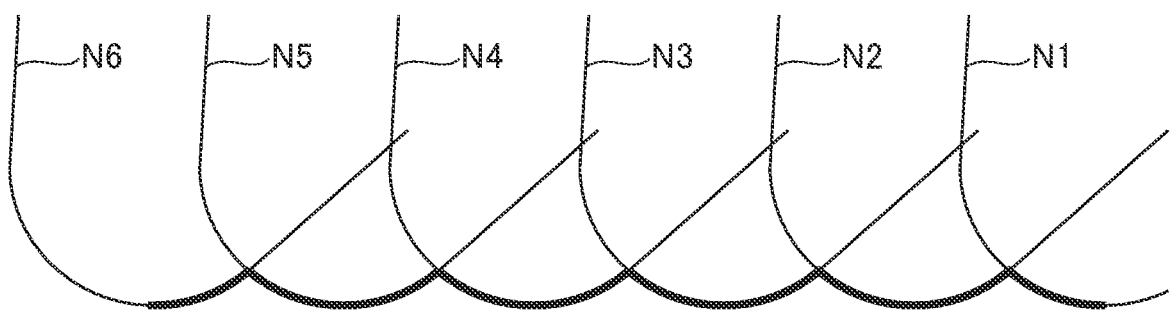
FIG. 3 is a diagram schematically showing surface unevenness of the workpiece during the non-oscillation cutting.

Here, FIG. 3 is a diagram schematically showing surface unevenness of a workpiece during the non-oscillation cutting. In FIG. 3, N1 to N6 indicate positions of the cutting tool in paths, respectively, during the non-oscillation cutting, and correspond to paths N1 to N6 in FIG. 2. In FIG. 3, a thick solid line represents surface unevenness of the workpiece. As shown in FIG. 3, during the non-oscillation cutting, the feed amount per rotation of the spindle is constant, and an advance amount of the cutting tool in the feed axis direction is constant, whereby the surface unevenness of the workpiece is constant due to a tool nose radius in the cutting tool always having a corner portion on a tool nose.

Figure 4:
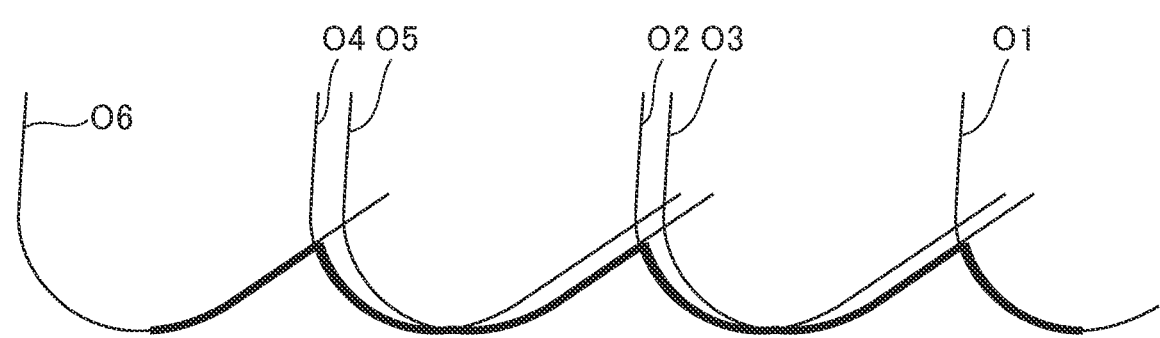
FIG. 4 is a diagram schematically showing surface unevenness of the workpiece during the conventional oscillation cutting.

On the other hand, FIG. 4 is a diagram schematically showing surface unevenness of a workpiece during the conventional oscillation cutting. More specifically, FIG. 4 is a diagram schematically showing surface unevenness of the workpiece during the conventional oscillation cutting at the position where the spindle phase is 240° indicated by the alternated long and short dash line in FIG. 2. In FIG. 4, O1 to O6 indicate positions of the cutting tool in paths, respectively, during the conventional oscillation cutting, and correspond to the paths O1 to O6 in FIG. 2. In FIG. 4, a thick solid line indicates surface unevenness of the workpiece. As described above, at the position where the spindle phase is 240° shown in FIG. 4, the feed amount per rotation of the spindle is represented by repetition of D2 in the feed axis direction and D3 in the direction opposite to the feed axis direction. For this reason, as shown in FIG. 4, the cutting tool advances in the feed axis direction by D2, and then reversely retreats by D3, and thus the surface unevenness of the workpiece due to the tool nose radius of the cutting tool increases. As the unevenness increases, surface roughness worsens. On the other hand, as described above, since the feed amount per rotation of the spindle is constant at the position where the spindle phase is 180° indicated by the alternated long and short dash line, the surface unevenness (roughness) of the workpiece is constant as in the non-oscillation cutting shown in FIG. 3. In the conventional oscillation cutting as described above, since the degree of the surface unevenness of the workpiece varies depending on the spindle phase, the degree of deterioration of the surface roughness may vary. This may also adversely affect the circularity of the workpiece.

To address the foregoing disadvantages, the machine tool controller 1 according to the present embodiment can reduce the deterioration in the machining accuracy for a workpiece by reducing variation in the surface unevenness of the workpiece described above. Specifically, the machine tool controller 1 according to the present embodiment compensates the oscillation command by causing the oscillation command compensation unit 14 to compensate the oscillation command such that the spindle phases at an arbitrary oscillation phase do not match with each other, thereby shifting the oscillation phase in which the air cutting C occurs and reducing variations in the surface unevenness of the workpiece.

More preferably, by compensating the oscillation command, the oscillation command compensation unit 14 changes a method of advancing the oscillation phase during a backward movement in one oscillation immediately before the spindle phases match with each other at the oscillation phase where the oscillation command becomes 0. This is because it is necessary to cause the air cutting C with the previous path during a forward movement in the oscillation, and it may be difficult to cause the air cutting C when the method of advancing the oscillation phase is changed during the forward movement.

Therefore, the oscillation command compensation unit 14 of the present embodiment calculates, based on oscillation conditions, the number of oscillations until the return to the same spindle phase. In addition, the oscillation command compensation unit 14 counts the number of oscillations, and changes the method of advancing the oscillation phase upon reaching the number of oscillations until the return to the same spindle phase.

Here, the number of oscillations to return to the same spindle phase depends on an oscillation frequency multiplying factor (the number of oscillations per rotation of the spindle) I. As an example of calculation, when the greatest common divisor is calculated for the oscillation frequency multiplying factor I with a weight of 0.001 times and 1000, I×1000/greatest common divisor is the number of oscillations until the return to the same spindle phase, and thus oscillation command compensation unit 14 calculates the number of oscillations according to this calculation formula. For example, when the oscillation frequency multiplying factor is 1.5 times, since the greatest common divisor of I×1000 (=1500 and 1000) is 500, 1500/500=3 times, and the number of oscillations until the return to the same oscillation phase is calculated as 3 times. A method of calculating the number of oscillations until the return to the same oscillation phase is not limited to the above calculation method, and may be other calculation methods.

Figure 5:
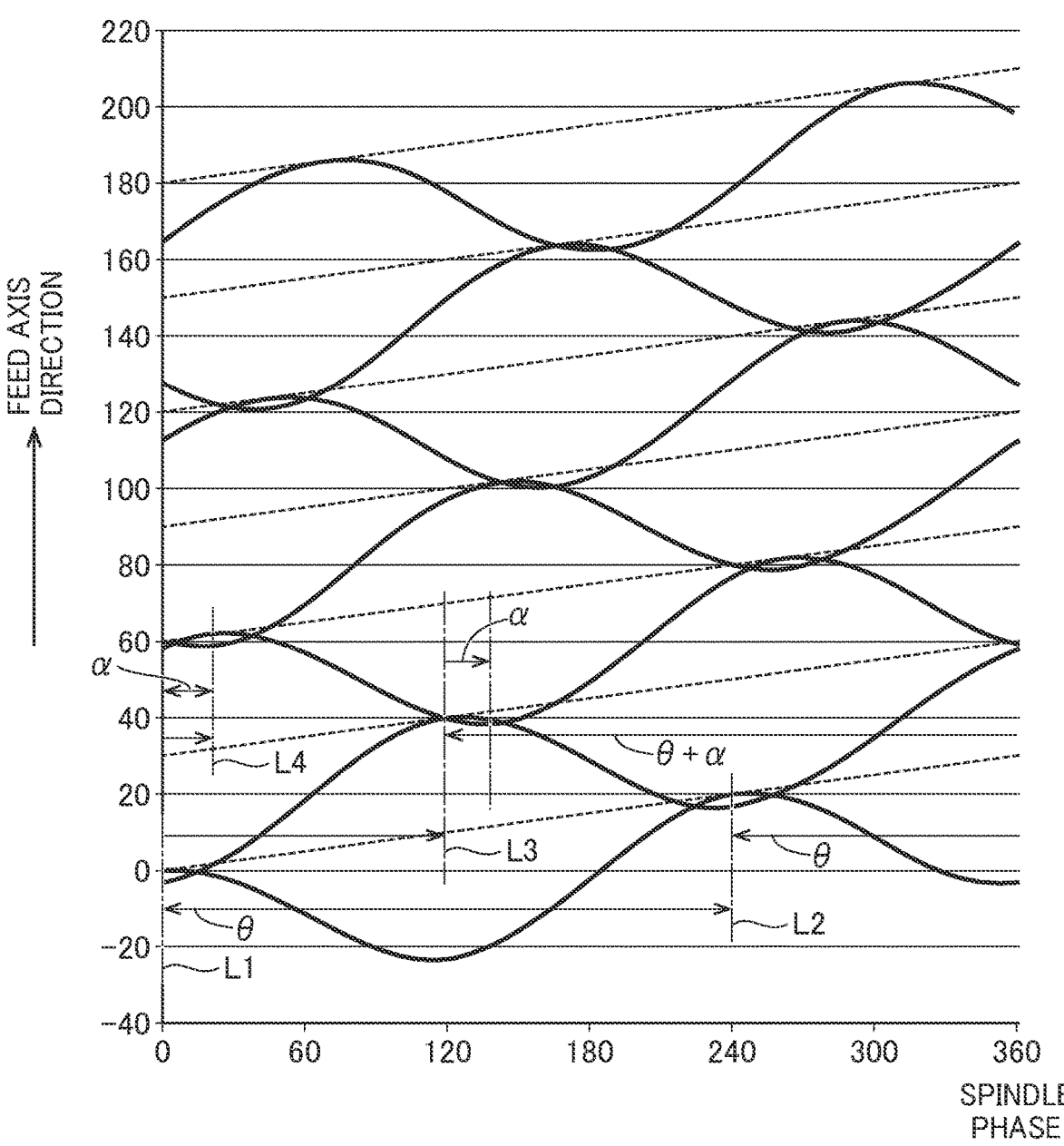
FIG. 5 is a diagram showing a trajectory of a cutting tool on a surface of a workpiece during the oscillation cutting according to the first embodiment of the present disclosure.

FIG. 5 is a diagram showing a trajectory of the cutting tool on the surface of the workpiece during the oscillation cutting according to the first embodiment of the present disclosure. The example shown in FIG. 5 shows the trajectory of the cutting tool on the surface of the workpiece when the oscillation frequency multiplying factor is 1.5 times. As described above, when the oscillation frequency multiplying factor is 1.5 times, the spindle phase returns to the original spindle phase after three oscillations. Further, when the oscillation frequency multiplying factor is 1.5 times, the air cutting C usually occur when the spindle phases are 0°, 120°, and 240°.

Here, as shown in FIG. 5, when once oscillation (one oscillation) advances the spindle phase by θ (an alternated long and short dash line L1 to an alternated long and short dash line L2, and an alternated long and short dash line L2 to an alternated long and short dash line L3), the oscillation phase is shifted by a with respect to the spindle phase when the oscillation phase is advanced by θ+α (an alternated long and short dash line L3 to an alternated long and short dash line L4) in a third oscillation immediately before the spindle phase returns to the original spindle phase. Thus, as is clear from FIG. 5, the spindle phase (the center thereof) where the air cutting C occurs can be shifted by a. In the present embodiment as described above, the air cutting phase (the phase where the air cutting occurs) is shifted, whereby the surface unevenness of the workpiece can be distributed and the deterioration of the surface roughness only in a specific spindle phase can be reduced due to the oscillation cutting.

Next, the change of the method of advancing the oscillation phase will be described in detail. First, the superimposition command (position command+oscillation command) of the present embodiment is calculated according to Equation (1) below.

[Math. 1]

$$Y = \frac{FS}{60}t + \frac{KF}{2}\left\{\cos\left(\frac{\pi SI}{30}t\right) - 1\right\}$$ Equation 1

In Equation (1), Y represents a superimposition command, F represents a feed amount per rotation [mm/rotation], S represents a spindle speed [min$^{-1}$], I represents an oscillation frequency multiplying factor [times], K represents an oscillation amplitude multiplying factor [times], and t represents a time [s]. Further, $(K \times F)/2$ represents an oscillation amplitude [mm], and $\pi SIt/30$ represents an oscillation phase (oscillation frequency) [rad]. The oscillation amplitude multiplying factor K and the oscillation frequency multiplying factor I are constants. The oscillation amplitude multiplying factor K is a number equal to or greater than 1, and the oscillation frequency multiplying factor I is a non-integer greater than zero (for example, positive non-integer of 0.5, 0.8, 1.2, 1.5, 1.9, 2.3, 2.5 . . . ). Values of these oscillation amplitude multiplying factor K and oscillation frequency multiplying factor I are stored in advance.

The oscillation phase is defined as $\theta$, and the oscillation phase $\theta$ [rad] described above is calculated according to Equation (2) below.

[Math. 2]

$$\theta = \frac{\pi SI}{30}t = \omega t$$ Equation 2

A time $t_1$ [s] required for one oscillation is calculated according to Equation (3) below.

[Math. 3]

$$t_1 = \frac{60}{SI}[s]$$ Equation 3

A spindle phase $\theta_1$ [rad] advanced by one oscillation is calculated according to Equation (4) below.

[Math. 4]

$$\theta_1 = \frac{\pi S}{30} \cdot \frac{60}{SI} = \frac{2\pi}{I}[\text{rad}]$$ Equation 4

A time $\Delta t$ [s] required to advance the spindle phase by a [rad] is calculated according to Equation (5) below.

[Math. 5]

$$\Delta t = \alpha / \frac{\pi s}{30} = \frac{30\alpha}{\pi s}[s]$$ Equation 5

Therefore, in a case of changing the method of advancing the oscillation phase in the oscillation immediately before the spindle phase returns to the original spindle phase by performing oscillation, when the oscillation phase $\theta$ is n to $2\pi$ [rad] in the path immediately before the spindle phase returns to the original spindle phase, the oscillation phase may be advanced at an angular speed $\omega'$ calculated according to Equations (6) and (7) below. In other words, the oscillation command compensation unit 14 may compensate the oscillation command such that the oscillation phase is advanced at the angular speed $\omega'$ in the oscillation immediately before the spindle phase returns to the original spindle phase by performing oscillation.

[Math. 6]

$$\omega\frac{t_1}{2} = \omega'\left(\frac{t_1}{2} + \Delta t\right)$$ Equation 6

[Math. 7]

$$\omega' = \omega\frac{\frac{t_1}{2}}{\frac{t_1}{2} + \Delta t} = \frac{\pi SI}{30}\left(\frac{\frac{30}{SI}}{\frac{30}{SI} + \frac{30\alpha}{\pi S}}\right) = \frac{\pi SI}{30} \cdot \frac{\pi}{\pi + \alpha I}$$ Equation 7

According to the machine tool controller 1 according to the present embodiment, the following effects can be achieved. The present embodiment includes the oscillation command generation unit 13 that generates the oscillation command based on the oscillation conditions and the oscillation command compensation unit 14 that compensates the oscillation command such that the spindle phases do not match with each other at an arbitrary oscillation phase. Thus, it is possible to shift the spindle phase at which the air cutting C occurs. For this reason, it is possible to distribute the surface unevenness of the workpiece and to reduce the deterioration of the surface roughness only in a specific spindle phase due to the oscillation cutting. Further, since the oscillation frequency is not changed as a whole, it is possible to reduce fluctuations in a length of the chips and to achieve a desired length of the chips. Accordingly, according to the present embodiment, it is possible to provide the machine tool controller 1 capable of achieving a desired length of the chips while reduce the deterioration of the machining accuracy.

The present embodiment has been configured such as the oscillation command compensation unit 14 changes the method of advancing the oscillation phase in one oscillation immediately before the spindle phases match with each other. More specifically, the present embodiment is configured such as the oscillation command compensation unit 14 changes the method of advancing the oscillation phase during the backward movement in the immediately preceding one oscillation. Since it is necessary to cause the air cutting C with the previous path during the forward movement in the oscillation, it may be difficult to cause the air cutting C when the method of advancing the oscillation phase is changed during the forward movement, whereas according to the present embodiment, in order to change the method of advancing the oscillation phase during the backward movement in the immediately preceding one oscillation, it is possible to shift the spindle phase at which the air cutting C occurs, and to cause the air cutting C with the previous path more reliably during the forward movement in the immediately preceding one oscillation.

Second Embodiment

In a machine tool controller according to a second embodiment, the oscillation command compensation unit 14 determines a direction in which the spindle phase is to be shifted according to the oscillation frequency multiplying factor I. Thus, in the present embodiment, a method of advancing the oscillation phase in the immediately preceding one oscillation is changed according to the shifted direction.

Figure 6:
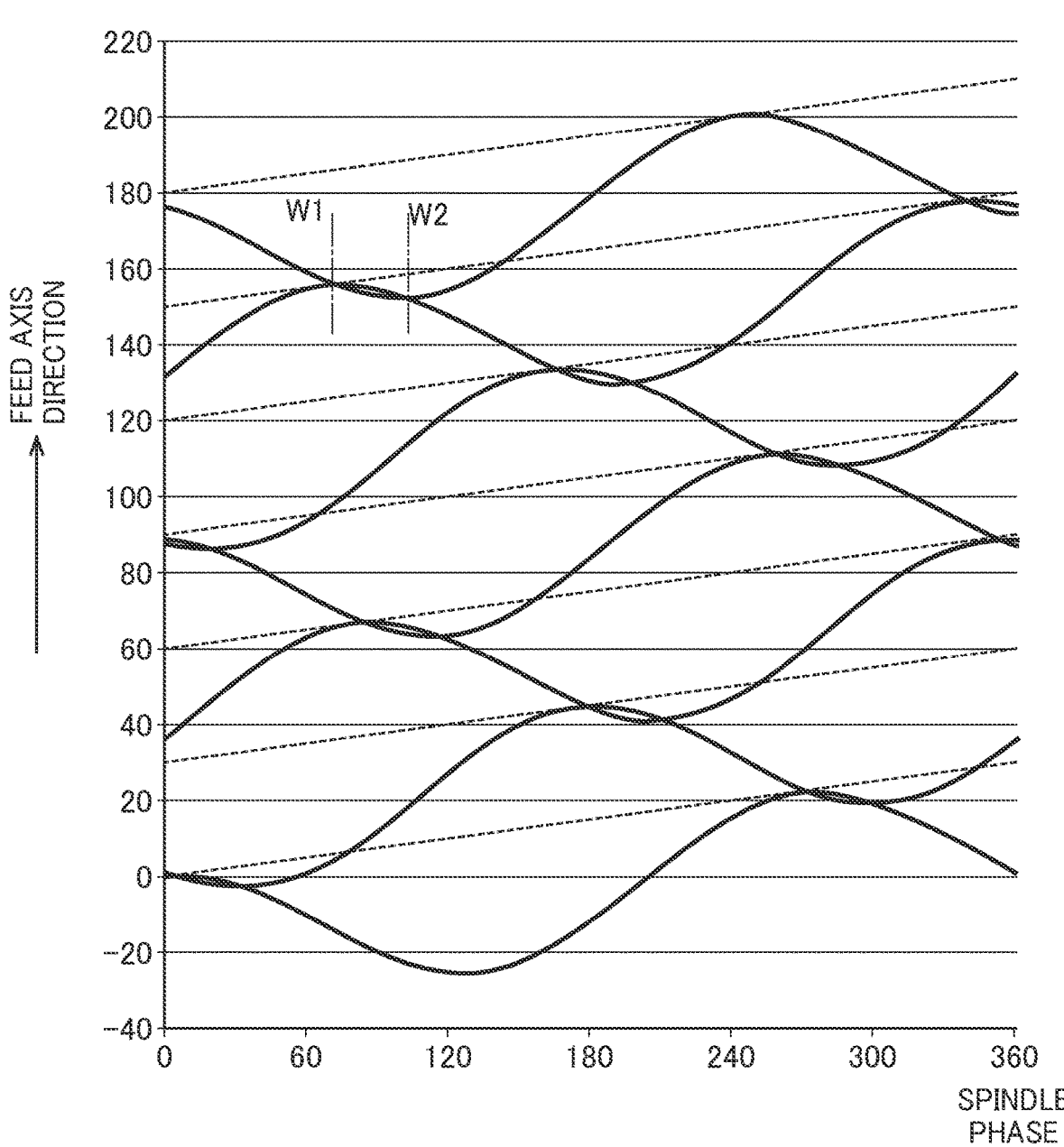
FIG. 6 is a diagram showing a trajectory of a cutting tool on a surface of a workpiece during oscillation cutting according to a second embodiment of the present disclosure, in which the oscillation frequency multiplying factor is 1.35 times.
Figure 7:
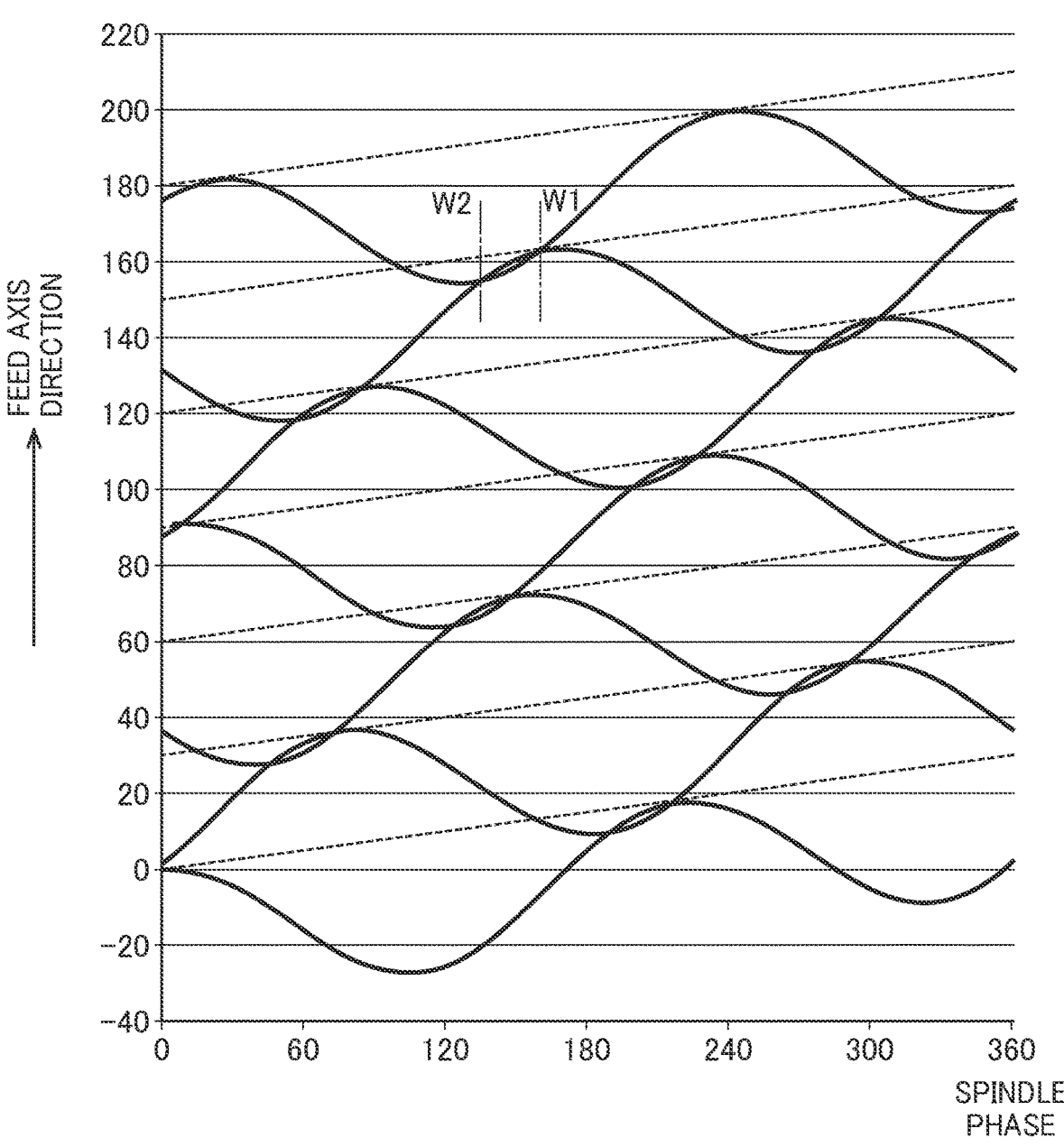
FIG. 7 is a diagram showing a trajectory of a cutting tool on a surface of a workpiece during the oscillation cutting according to the second embodiment of the present disclosure, in which the oscillation frequency multiplying factor is 1.65 times.

FIG. 6 is a diagram showing a trajectory of the cutting tool on the surface of the workpiece during oscillation cutting according to the second embodiment of the present disclosure, in which the oscillation frequency multiplying factor is 1.35 times. Further, FIG. 7 is a diagram showing a trajectory of the cutting tool on the surface of the workpiece during oscillation cutting according to the second embodiment of the present disclosure, in which the oscillation frequency multiplying factor is 1.65 times. In FIGS. 6 and 7, W1 represents a crest of the oscillation operation, and W2 represents a valley of the oscillation operation.

As is clear from FIGS. 6 and 7, a positional relationship between the crest W1 and the valley W2 of the oscillation operation changes depending on the oscillation frequency multiplying factor I. Here, since the air cutting C occurs by intersection between the crest W1 and the valley W2 of the oscillation operation, the positional relationship therebetween is greatly related to the occurrence of the air cutting C. Therefore, in which direction the spindle phase is shifted is determined according to the positional relationship between the crest W1 and the valley W2, whether the air cutting C is likely to occur when the spindle phase is shifted. In other words, in which direction the spindle phase is shifted is determined according to the oscillation frequency multiplying factor I.

Specifically, the oscillation command compensation unit 14 of the present embodiment compensates the oscillation command in a direction in which the spindle phase is delayed when the oscillation frequency multiplying factor I is equal to or less than n.5 times (in the case of FIG. 6). Further, the oscillation command compensation unit 14 of the present embodiment compensates the oscillation command in a direction in which the spindle phase is advanced when the oscillation frequency multiplying factor I exceeds n.5 times (in the case of FIG. 7). Here, n is an integer of 1 or more.

As shown in FIG. 6, when the oscillation frequency multiplying factor is 1.35 times, it can be seen that the delay of the spindle phase makes it easier for the crest W1 and the valley W2 to intersect and makes it easier for the air cutting C to occur. Here, the delay of the spindle phase means a case where the above-described a in FIG. 5 is negative and the oscillation phase quickly advances. In other words, the direction in which the spindle phase is delayed means a direction in which the spindle phase advanced in one oscillation decreases.

On the other hand, as shown in FIG. 7, when the oscillation frequency multiplying factor is 1.65 times, it can be seen that the advance of the spindle phase makes it easier for the crest W1 and the valley W2 to intersect and makes it easier for the air cutting C to occur. Here, the advance of the spindle phase means a case where the above-described a in FIG. 5 is positive and the oscillation phase slowly advances. In other words, the direction in which the spindle phase is advanced means a direction in which the spindle phase advanced in one oscillation increases.

According to the present embodiment, the following effects can be achieved. The present embodiment has a configuration in which the oscillation command compensation unit 14 determines the direction in which the spindle phase is to be shifted according to the oscillation frequency multiplying factor I, thereby changing the method of advancing the oscillation phase in the immediately preceding one oscillation. Thus, it is possible to determine whether to advance the oscillation phase fast or slow according to the oscillation frequency multiplying factor I, and thus the effects of the first embodiment can be obtained more reliably.

Third Embodiment

In a machine tool controller according to a third embodiment, the oscillation command compensation unit 14 changes the method of advancing the oscillation phase in one oscillation immediately before the spindle phases match with each other at an arbitrary oscillation phase and changes the oscillation amplitude.

In the machine tool controller according to the third embodiment, the oscillation command compensation unit 14 compensates the oscillation command so as to shift the spindle phase within the range where the air cutting C occurs.

Here, when the spindle phase is greatly shifted in the oscillation cutting, the air cutting C may not occur unless the oscillation amplitude is also changed. Therefore, in the present embodiment, the oscillation amplitude is compensated depending on the shift amount of the spindle phase. Alternatively, the shift amount of the spindle phase is determined within a range in which the oscillation amplitude does not need to be compensated.

Figure 8:
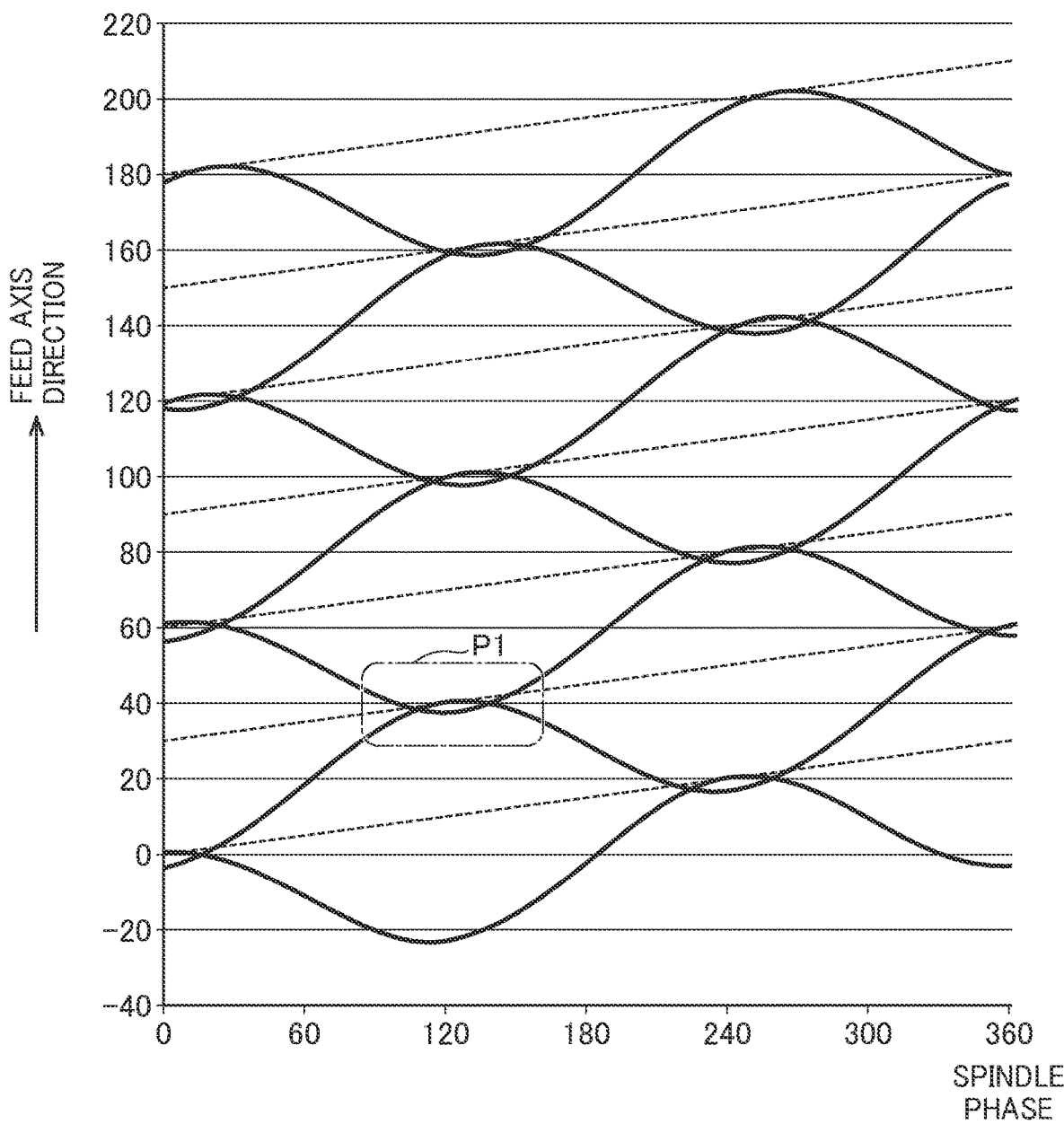
FIG. 8 is a diagram showing a trajectory of a cutting tool on a surface of a workpiece during oscillation cutting according to a third embodiment of the present disclosure, in which the shift amount of a spindle phase is 10°.

FIG. 8 is a diagram showing a trajectory of the cutting tool on the surface of the workpiece during oscillation cutting according to the third embodiment of the present disclosure, in which the spindle phase advances by 10° when the oscillation frequency multiplying factor is 1.5 times. As indicated by P1 in FIG. 8, it can be seen that the air cutting C occurs where the crest and the valley of the oscillation operation intersect even when the spindle phase advances by 10°.

Figure 9:
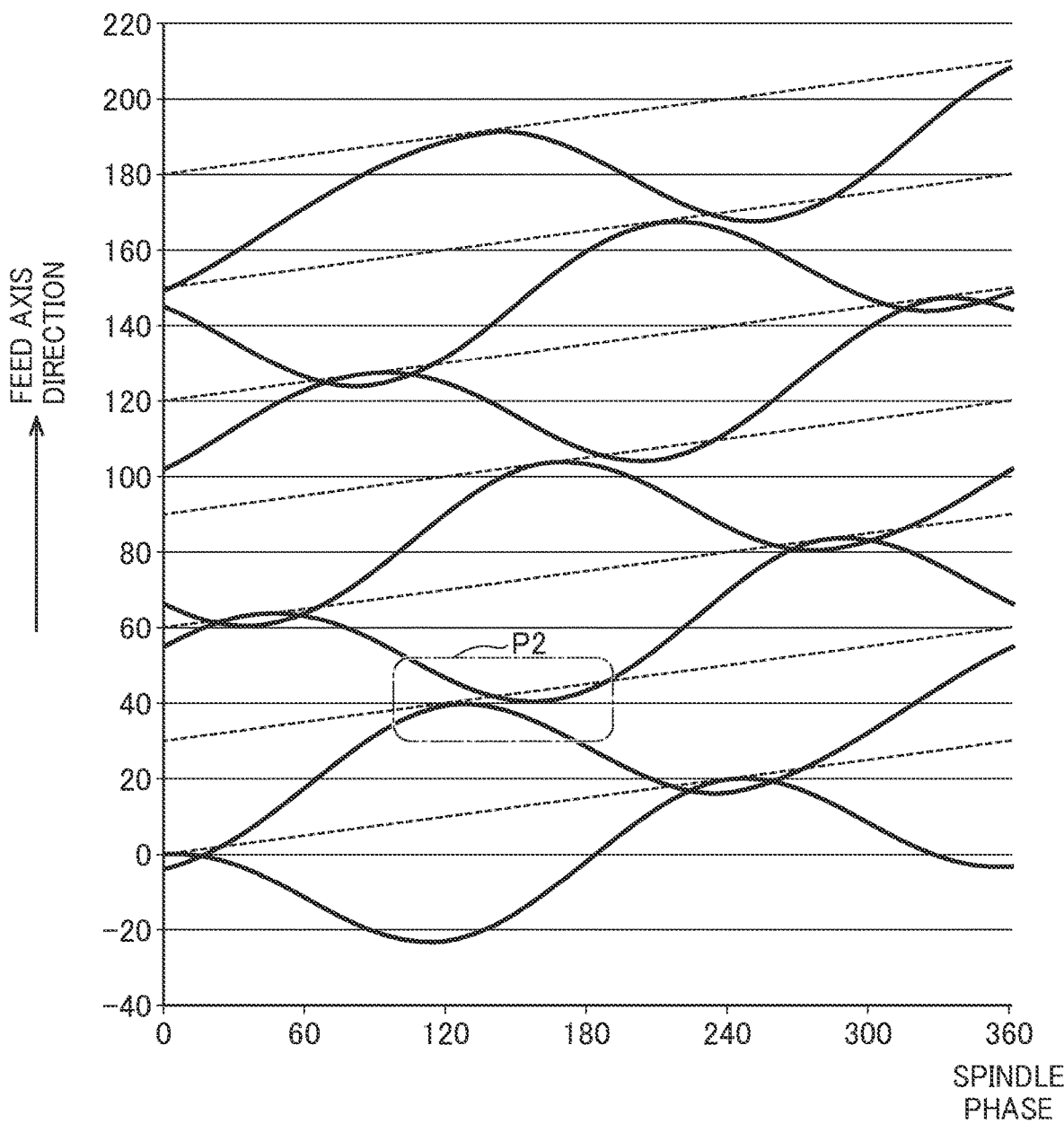
FIG. 9 is a diagram showing a trajectory of a cutting tool on a surface of a workpiece during oscillation cutting according to the third embodiment of the present disclosure, in which the shift amount of the spindle phase is 50°.

On the other hand, FIG. 9 is a diagram showing a trajectory of the cutting tool on the surface of the workpiece during oscillation cutting according to the third embodiment of the present disclosure, in which the spindle phase advances by 50° when the oscillation frequency multiplying factor is 1.5 times. As indicated by P2 in FIG. 9, it can be seen that the crest and the valley of the oscillation operation do not intersect and the air cutting C does not occur when the spindle phase advances by 50°. Therefore, in this case, it can be seen that the oscillation amplitude needs to be increased.

According to the present embodiment, the following effects are achieved. The present embodiment has been configured in which the oscillation command compensation unit 14 changes the method of advancing the oscillation phase in one oscillation immediately before the spindle phases match with each other at an arbitrary oscillation phase and changes the oscillation amplitude. Thus, it is possible to cause the air cutting C more reliably by changing the oscillation amplitude even when the spindle phase is greatly shifted.

Further, the present embodiment has been configured in which the oscillation command compensation unit 14 compensates the oscillation command so as to shift the spindle phase within the range where the air cutting C occurs. Thus, it is possible to cause the air cutting C more reliably without changing the oscillation amplitude.

Fourth Embodiment

In a machine tool controller according to a fourth embodiment, the oscillation command compensation unit 14 determines the amount to advance the spindle phase based on a distance between spindle phases at which the air cutting C occurs. Thus, in the present embodiment, the oscillation command compensation unit 14 changes the method of advancing the oscillation phase in one oscillation immediately before the spindle phases match with each other at an arbitrary oscillation phase, based on the distance between the spindle phases at which the air cutting C occurs.

Here, a distance between spindle phases at which the air cutting C occurs depends on the number of oscillations until the return to spindle phase equal to the original spindle phase. In other words, the distance between the spindle phases at which the air cutting C occurs is calculated according to Equation (8) below.

[Math. 8]

$$\text{Distance} = \frac{360}{\substack{\text{Number of oscillations} \\ \text{until return to the same spindle phase}}} [deg] \qquad \text{Equation 8}$$

Therefore, the oscillation command compensation unit 14 of the present embodiment determines the amount to advance the spindle phase based on the distance between the spindle phases at which the air cutting C occurs, as calculated according to Equation (8) above. Specifically, the oscillation command compensation unit 14 determines the amount (the above-described a) to advance the spindle phase within a range of the distance between the spindle phases at which the air cutting C occurs, and changes the method of advancing the oscillation phase in one oscillation immediately before the spindle phases match each other at an arbitrary oscillation phase, according to the determined advance amount. The advance amount of the spindle phase may be a fixed value set in advance, or may be determined according to oscillation conditions, for example, the oscillation frequency multiplying factor I.

Figure 10:
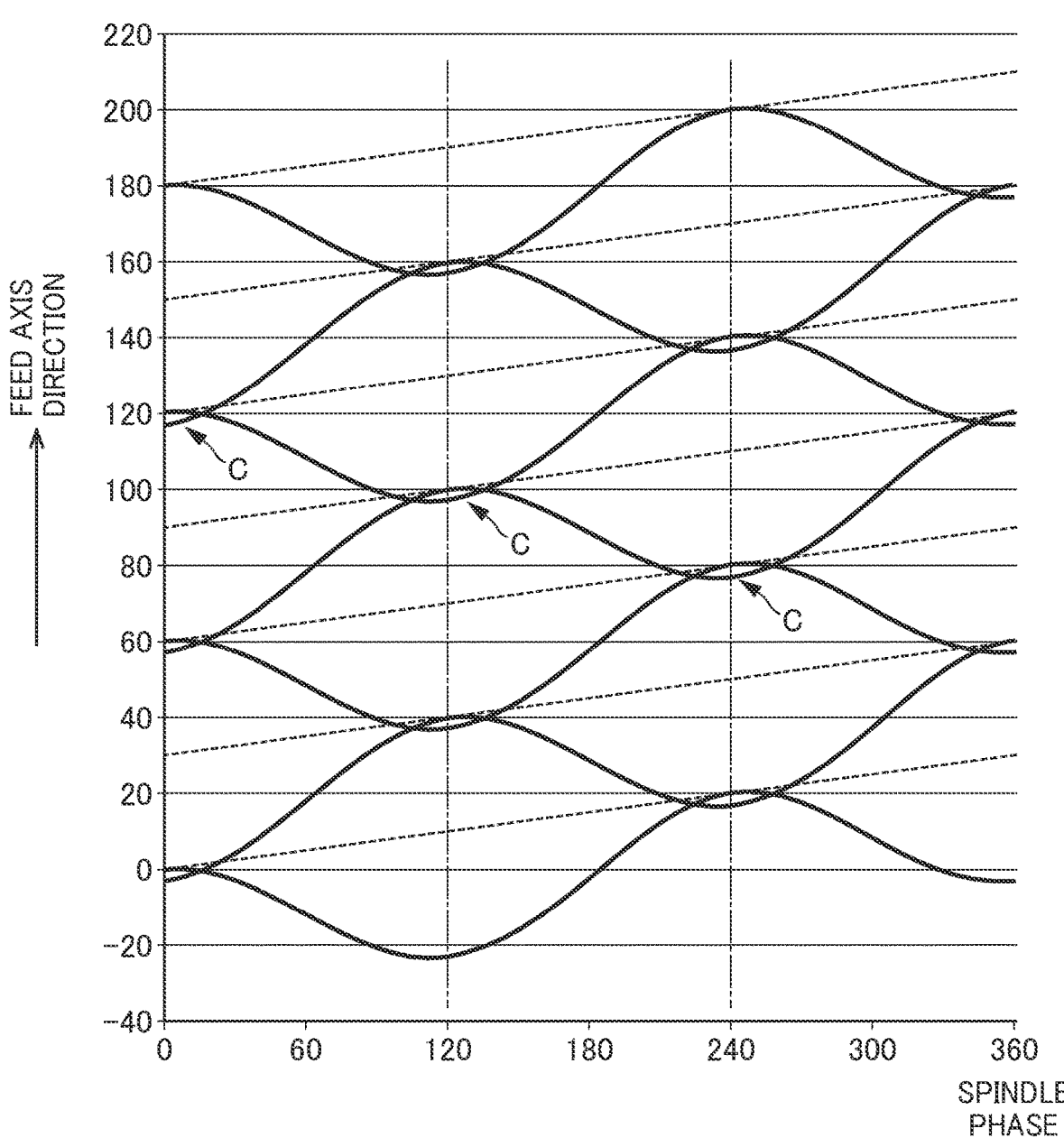
FIG. 10 is a diagram showing a trajectory of a cutting tool on a surface of a workpiece during oscillation cutting according to a fourth embodiment of the present disclosure, in which the oscillation frequency multiplying factor is 1.5 times.

FIG. 10 is a diagram showing a trajectory of the cutting tool on the surface of the workpiece during oscillation cutting according to the fourth embodiment of the present disclosure, in which the oscillation frequency multiplying factor is 1.5 times. As shown in FIG. 10, when the oscillation frequency multiplying factor is 1.5 times, the number of oscillations until the return to the original spindle phase is three as described above. Therefore, from Equation (8) above, it can be seen that the distance between the spindle phases at which the air cutting C occurs is 120°, specifically, when the spindle phases are 0°, 120°, and 240°. In this case, the advance amount of the spindle phase is determined with the range of 120° of the spindle phase.

According to the present embodiment, the following effects are achieved. The present embodiment has been configured in which the oscillation command compensation unit 14 determines the amount to advance the spindle phase based on the distance between the spindle phases at which the air cutting C occurs and changes the method of advancing the oscillation phase in one oscillation immediately before the spindle phases match each other at an arbitrary oscillation phase. Thus, since the shift amount of the spindle phase can be determined, it is possible to obtain the effects of the first embodiment more reliably.

Fifth Embodiment

Figure 11:
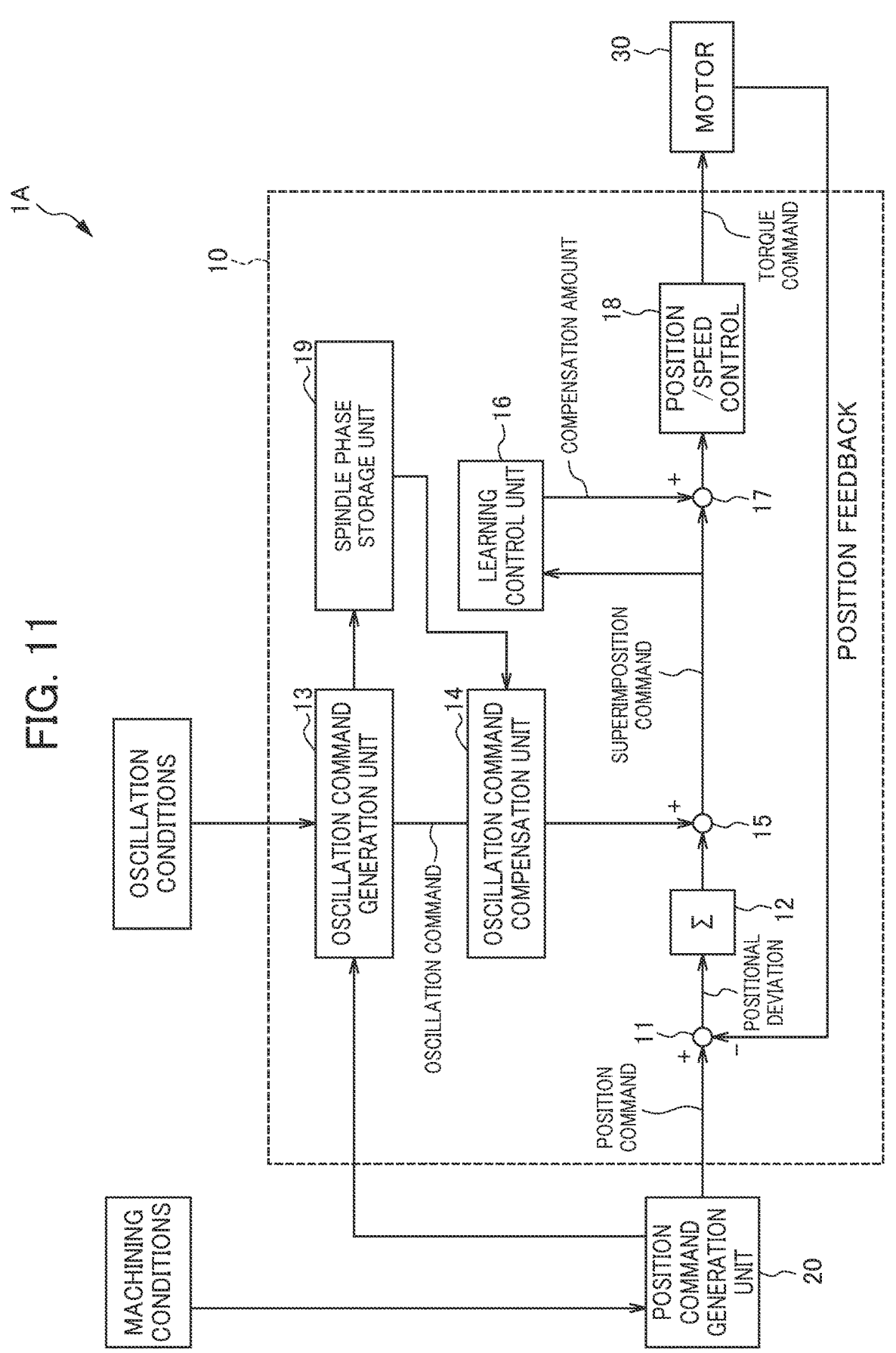
FIG. 11 is a diagram showing a configuration of a machine tool controller according to a fifth embodiment of the present disclosure.

FIG. 11 is a diagram showing a configuration of a machine tool controller 1A according to a fifth embodiment. The machine tool controller 1A according to the fifth embodiment further includes a spindle phase storage unit 19 that stores a spindle phase in an arbitrary oscillation phase. Further, the oscillation command compensation unit 14 changes the method of advancing the oscillation phase in the immediately preceding one oscillation such that a next spindle phase at the arbitrary oscillation phase does not match with the spindle phase stored in the spindle phase storage unit 19.

More specifically, the spindle phase storage unit 19 stores a spindle phase at an arbitrary oscillation phase of the oscillation command generated by the oscillation command generation unit 13. The spindle phase stored in the spindle phase storage unit 19 is input to the oscillation command compensation unit 14.

The oscillation command compensation unit 14 changes the method of advancing not only the immediately preceding spindle phase but also the past spindle phase stored in the spindle phase storage unit 19 described above and the oscillation phase in the immediately preceding one oscillation such that the next spindle phase at the arbitrary oscillation phase does not match.

According to the present embodiment, the following effects are achieved. In the present embodiment, the spindle phase, which is an arbitrary oscillation phase determined from the oscillation conditions in each of the embodiments described above, is replaced with the spindle phase stored in the spindle phase storage unit 19. Therefore, according to the present embodiment, since the method of advancing the oscillation phase in the immediately preceding oscillation is changed such that the spindle phase at an arbitrary oscillation phase does not match the past spindle phase stored in the spindle phase storage unit 19, it is possible to continue to oscillate without making the spindle phases match at the arbitrary oscillation phase. As a result, it is possible to realize a desired length of chips while reducing the deterioration of the machining accuracy.

It should be noted that the present disclosure is not limited to the above-described embodiments, and includes modifications and improvements within a range in which the purpose of the present disclosure can be achieved.

EXPLANATION OF REFERENCE NUMERALS

1, 1A: machine tool controller
10: servo controller
11: first adder
12: integrator
13: oscillation command generation unit
14: oscillation command compensation unit
15: second adder
16: learning controller (learning control unit)
17: third adder (learning control unit)
18: position/speed control unit (control unit)
19: spindle phase storage unit
20: position command generation unit
30: motor

The invention claimed is:

1. A machine tool controller for controlling a machine tool that performs machining while causing a tool and a workpiece to oscillate relative to each other, the machine tool controller comprising a processor, the processor configured to:

generate an oscillation command based on oscillation conditions;

compensate the oscillation command such that spindle phases do not match with each other at an arbitrary oscillation phase;

cause the tool and the workpiece to oscillate relative to each other based on a superimposition command generated by superimposing the compensated oscillation command on a movement command; and change a method of advancing an oscillation phase in one oscillation immediately before spindle phases match with each other.

2. The machine tool controller according to claim 1, wherein the processor is configured to change a method of advancing an oscillation phase during a backward movement in one oscillation immediately before spindle phases match with each other at an oscillation phase where the oscillation command becomes 0.

3. The machine tool controller according to claim 1, wherein the processor is configured to determine in which direction a spindle phase is to be shifted according to an oscillation frequency multiplying factor, and changes the method of advancing the oscillation phase in the one oscillation immediately before the spindle phases match with each other, according to the direction.

4. The machine tool controller according to claim 1, wherein the processor is configured to store a spindle phase at an arbitrary oscillation phase, and change the method of advancing the oscillation phase in the one oscillation immediately before the spindle phases match with each other, such that a next spindle phase at the arbitrary oscillation phase does not match with the spindle phase stored in the spindle phase storage unit.

5. The machine tool controller according to claim 1, wherein the processor is configured to change the method of advancing the oscillation phase in the one oscillation immediately before the spindle phases match with each other, and changes an oscillation amplitude.

6. The machine tool controller according to claim 1, wherein the processor is configured to change the method of advancing the oscillation phase in the one oscillation immediately before the spindle phases match with each other such that the spindle phase shifts within a range where air cutting occurs.

7. The machine tool controller according to claim 1, wherein the the processor is configured to change the method of advancing the oscillation phase in the one oscillation immediately before the spindle phases match with each other so as to shift the spindle phase based on a distance between spindle phases at which air cutting occurs.

8. The machine tool controller according to claim 1, wherein the processor is configured to calculate a compensation amount for the superimposition command based on the superimposition command and compensates the superimposition command by adding the calculated compensation amount.

* * * * *